UNITED STATES PATENT OFFICE.

ANDREW H. WARD, JR., OF BOSTON, MASSACHUSETTS.

IMPROVEMENT IN COMPOSITIONS FOR TREATING WOOL.

Specification forming part of Letters Patent No. 14,037, dated January 1, 1856.

*To all whom it may concern:*

Be it known that I, ANDREW H. WARD, Jr., of Boston, in the county of Suffolk and State of Massachusetts, have invented a new and useful mode or process of treating wool or fibrous matters in lieu of oiling them, and cleansing them of oil in the common manner or way preparatory to their being carded or otherwise operated on in the process of their manufacture; and I hereby declare that the same is fully described in the following specification.

In the treatment of wool or goods I do not make use of oil, or of a combination of its approximate constituents—oleine, stearine, and margarine; but I employ a nearly-pure oleic acid, from which the oxides of all metals and earthy bodies have been removed by exact chemical processes. In this first step of my process I allow the oleic acid to be used in the same way that oil has ordinarily been used. A small quantity, however, is sufficient for producing the desired effect, as the purified oleic acid has a greater penetrating power in saturating the fibers of the wool. When the wool or goods manufactured from it are to be cleansed I make use of a compound of purified carbonate of soda, sulphate of soda, and common salt. This compound contains about forty-eight parts carbonate of soda, ten parts sulphate soda, and forty-one parts of common salt; or instead of the above compound I can use one hundred and thirty parts of pearlash, ten parts sulphate soda, and forty-one parts common salt. One pound of the first-named compound, which I call "prepared soda-ash," or one and three-fourths pound of the prepared pearlash, must be used for every quart of the oleic acid added to the wool in the process of oiling it, and this proportion dissolved in water is to be mixed with the portion of water in which the goods are first washed.

The oleic acid is the fluid part of oil which has been saponified, and is obtained from the soap by means of an acid and subsequent purification. When it is brought in contact with a carbonated alkali it unites with its base and disengages carbonic acid, which escapes, while the result of its combination is an imperfect soap. The neutral salts—sulphate soda and common salt—are used to precipitate this soap with the dirt the moment they are brought out of the wool or goods. A simple carbonate of soda will not produce this effect, and does not perfectly cleanse the goods from the oleic acid used.

I am aware that a crude mixture of oleic and margaric acids with other impurities has been before used in oiling wool, and efforts have been made to remove such oleaginous matters by means of either carbonate or caustic soda with no good results, while my improvement, in which oleic acid and a mixture of carbonate of soda and neutral alkaline salts are substituted, is effectual, and leaves the goods in a remarkable clean state. When the goods are to be subjected to the operation of fulling or milling they are wet down with water in which the above proportion of prepared soda-ash has been dissolved in the trough of the fulling-stocks. The operation may then proceed as usual.

In the use of my improvement it is not necessary to strictly adhere to these proportions of prepared soda-ash or pearlash, for the workmen soon learn by the production of strong suds and foam how much of the dissolved salts to use in the "rinsers" to produce the best effects for the object in view. The saving effected by my improvement is that of the whole cost of the oil ordinarily used in oiling wool, as the cost of the soap necessarily used in removing it exceeds the cost of the oleic acid and prepared soda-ash and pearlash as now sold in the market.

I am aware of the process of John Mercer, as described in "Dingler's Polytechnic Journal," vol. 103, page 158, such process consisting in using phosphates and arseniates of potash, soda, and ammonia with carbonates of potash, soda, ammonia, soap, and urine. The said process, however, is for preparing goods in the scouring to adapt them for receiving mordants. Subphosphate of soda and subarseniate of soda act in washing or scouring as carbonate of soda or other alkaline salt. They will not coagulate the oleate of soda to form soap. Besides, the prices of them—sixteen and fourteen cents per pound—render them incapable of being employed to profitable advantage. My process is based on the ordinary process of making soap. After the oil is dissolved in alkaline salts it is not soap; but the addition of neutral salts, such as are named, causes the separation of a perfect soap and its subsequent action as a detergent. Oleic acid dissolved in carbonate of soda or caustic soda or potash has no detersive power, but is much like gum-water—a peculiarity of this chemical in a marked degree. Neutral salts cause soap to separate, and give the manufacturer the advantage attained thereby.

I do not claim the employment of ordinary oils or the mixture of crude oily acids, called "red oil," for oiling and cleansing wool and goods; nor do I claim the use of a nearly-pure oleic acid in the treatment of wool, nor its subsequent removal by alkaline carbonates only; but What I do claim is—

The employment of neutral salts, as specified, with the alkaline carbonates and the oleic acid, for the purpose and to produce results as stated.

In testimony whereof I have hereunto set my signature this 4th day of April, A. D. 1855.

ANDREW H. WARD, Jr.

Witnesses:
  R. H. EDDY,
  F. P. HALE, Jr.